June 1, 1954 — M. H. STARR — 2,680,014
TYPE REGISTERING POISE
Filed April 5, 1951 — 3 Sheets-Sheet 1

INVENTOR.
Morton Hull Starr
BY
Atty.

June 1, 1954      M. H. STARR      2,680,014
TYPE REGISTERING POISE

Filed April 5, 1951      3 Sheets-Sheet 2

INVENTOR.
Morton Hull Starr
BY
Paul L. Krohn
Atty.

June 1, 1954 — M. H. STARR — 2,680,014
TYPE REGISTERING POISE
Filed April 5, 1951 — 3 Sheets-Sheet 3

INVENTOR.
Morton Hull Starr

Patented June 1, 1954

2,680,014

UNITED STATES PATENT OFFICE 2,680,014

TYPE REGISTERING POISE

Morton Hull Starr, Davenport, Iowa, assignor to Fairbanks, Morse & Co., Chicago, Ill., a corporation of Illinois Application April 5, 1951, Serial No. 219,440

3 Claims. (Cl. 265—56.5)

This invention relates to improvements in weighing scales. More particularly it has to do with a novel, improved auxiliary poise pivotally mounted in the casing of the main poise and arranged to permit the operator to obtain quickly, a more accurate final balance of the beam and a more accurate indication of weight.

Heretofore it has been a general practice in constructing recording beam scales to employ auxiliary poises actuated by intricate mechanisms to obtain the desired indication of smaller divisions of weight. The more intricate the mechanism, the greater is the probability that it will be damaged or knocked out of adjustment during normal operation. Moreover, for some weighing operations, the conditions of use and the range of accuracy required dictate that a simple, sturdy poise mechanism be employed in the scale.

It is therefore an important object of the present invention to provide a simple, sturdy, easily manipulated auxiliary poise mechanism for a recording-type weighing scale.

Another object of this invention is the provision of an auxiliary poise mechanism that is mounted wholly inside the casing of the main poise, thus assuring substantially dust-free and moisture-free operation.

A further object is to provide a main and auxiliary poise arrangement so disposed and correlated as to consolidate the mechanism in very compact form, and to provide for the full weighing capacity of the scale without the use of large or cumbersome mechanism.

To carry out the above-mentioned objects, my invention includes a scale beam on which a main poise is adjustably mounted for movement between equispaced notches. A first auxiliary poise is mounted in the casing of the main poise for slidably adjustable movement in a direction longitudinally of the scale beam. The first auxiliary poise is adjusted inside the casing by means of a gear mechanism which has a shaft extending through the casing for actuation, exteriorly of the casing, by means of a manually controlled knob. The control knob has a disk with numerical indicia thereon graduated so that each movement of the first auxiliary poise, as it traverses between stops mounted inside the casing, is registered by the control knob as a fractional part of the amount registered on the scale beam when the main poise is moved from one notch to the next adjacent notch. In a preferred embodiment, each notch on the scale beam may represent 1000 units while the total traverse of the first auxiliary poise may represent 999 units.

A second auxiliary poise is mounted inside the casing on the shaft of the control knob. This second auxiliary poise is in the form of a right angle lever or bellcrank pivoted near the apex of the angle. One arm of the lever is disposed in a substantially horizontal position and carries, adjacent its outer free end, the numeral zero and the numeral 5. These numerals are disposed on the side face of the lever facing the front wall of the casing so that each numeral can be selectively positioned for viewing through a window in the front wall. The disk of the above-mentioned control knob has a diameter such that the indicia thereon may be selectively positioned alongside the window in alignment with the numeral on the second auxiliary poise.

The second arm of the right angle poise is disposed in a substantially vertical direction, extending downwardly from its pivot axis. An over-center linkage controls the movement of the poise between the "zero" position and the "five" position, it being understood that movement from zero to five entails a counter-clockwise movement of the lever resulting in a shifting of the lower end of the vertical arm from left to right. This movement of the vertical arm, in effect, causes a shifting of the weight of the main poise longitudinally of the scale beam a distance calculated to register an amount equal to one-half of one unit.

Thus, in operation, the main poise is adjusted to bring the beam to the closest hundreds balance, the first auxiliary poise is adjusted to bring the beam to substantial units balance, and the second auxiliary lever-type poise is actuated to bring the beam to the closest one-half unit balance.

A special feature of the invention resides in the novel, angle-type auxiliary poise and the over-center linkage which controls its movement.

Other and further features, objects, and advantages of the present invention will be apparent to one skilled in the art from the following detailed description taken in connection with the accompanying drawings.

Figure 1:
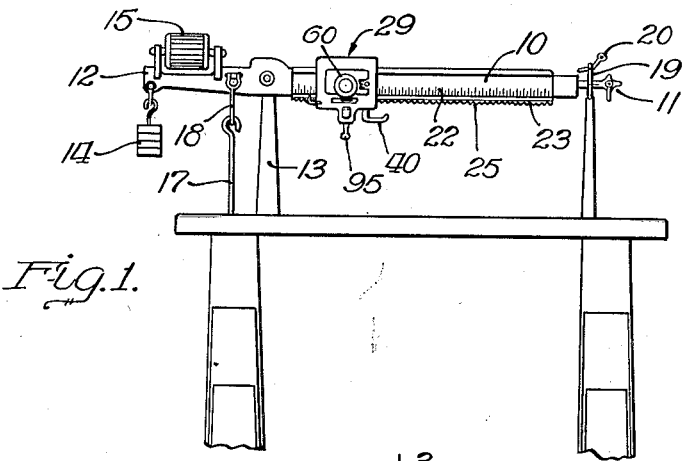
Figure 1 is a fragmentary front elevational view of a scale having a poise mechanism embodying the features of the present invention.
Figure 2:
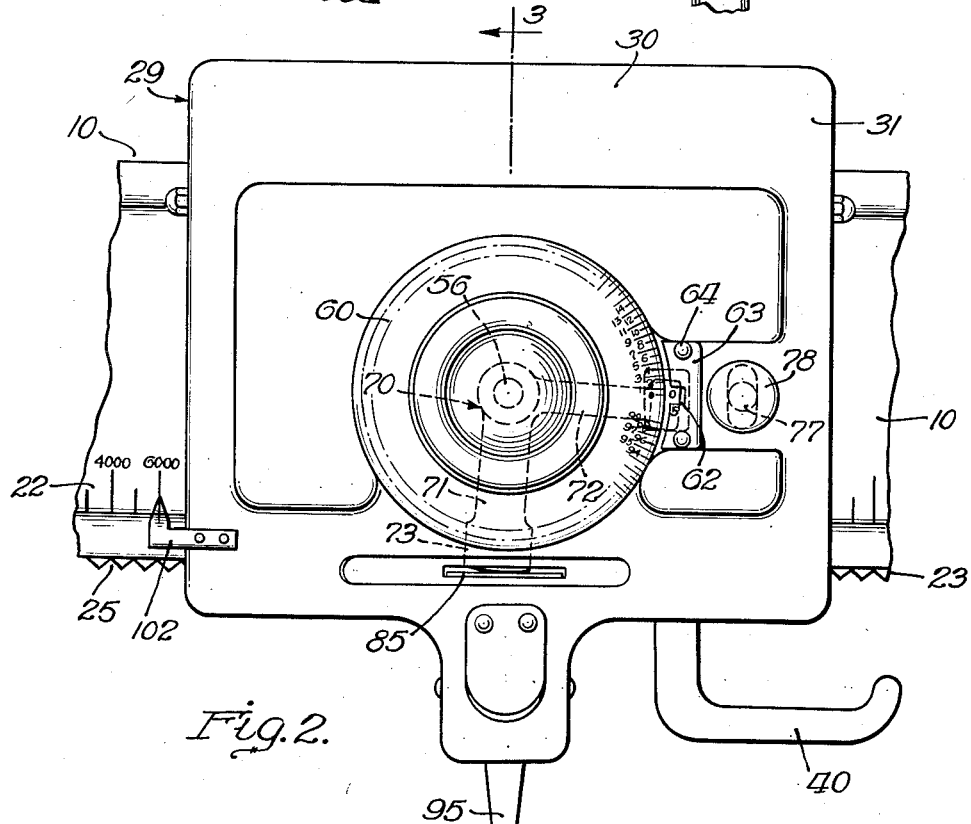
Figure 2 is an enlarged, fragmentary front elevational view of the poise mechanism shown in Figure 1.

Referring to Figure 1, it will be observed that the weighing beam of the present invention comprises generally a main beam or bar 10, preferably of I-shape in cross-section, the head 12 of which is supported on a standard 13 and is equipped with the usual balancing weights 14 and 15. The load is applied to the beam 10 from the scale platform (not shown), through a link 17 and a clevis 18. The opposite end 11 of the beam moves, in its balance-indicating movement, inside a limiting yoke 19 which is equipped with the usual weighted latch 20. Graduated numerical indicia 22 are inscribed, in any suitable manner, on the front face of the beam 10. A plate 23 is attached to the rear face of the beam, being set in a recess 24, Figure 3, in the lower end. The plate 23 is provided with notches 25 spaced equidistant with the spaces between the numbers 22 on the face of the beam so that each number bears a fixed relation to a corresponding one of said notches. As illustrated in Figure 2, each notch represents an advance of 1000 pounds. The bottom face of the beam is provided with a type plate 26, suitably secured thereto, and carrying corresponding type numerals by which the weight in thousand pounds of the load may be printed upon a ticket in a manner to be described hereinafter.

Figure 3:
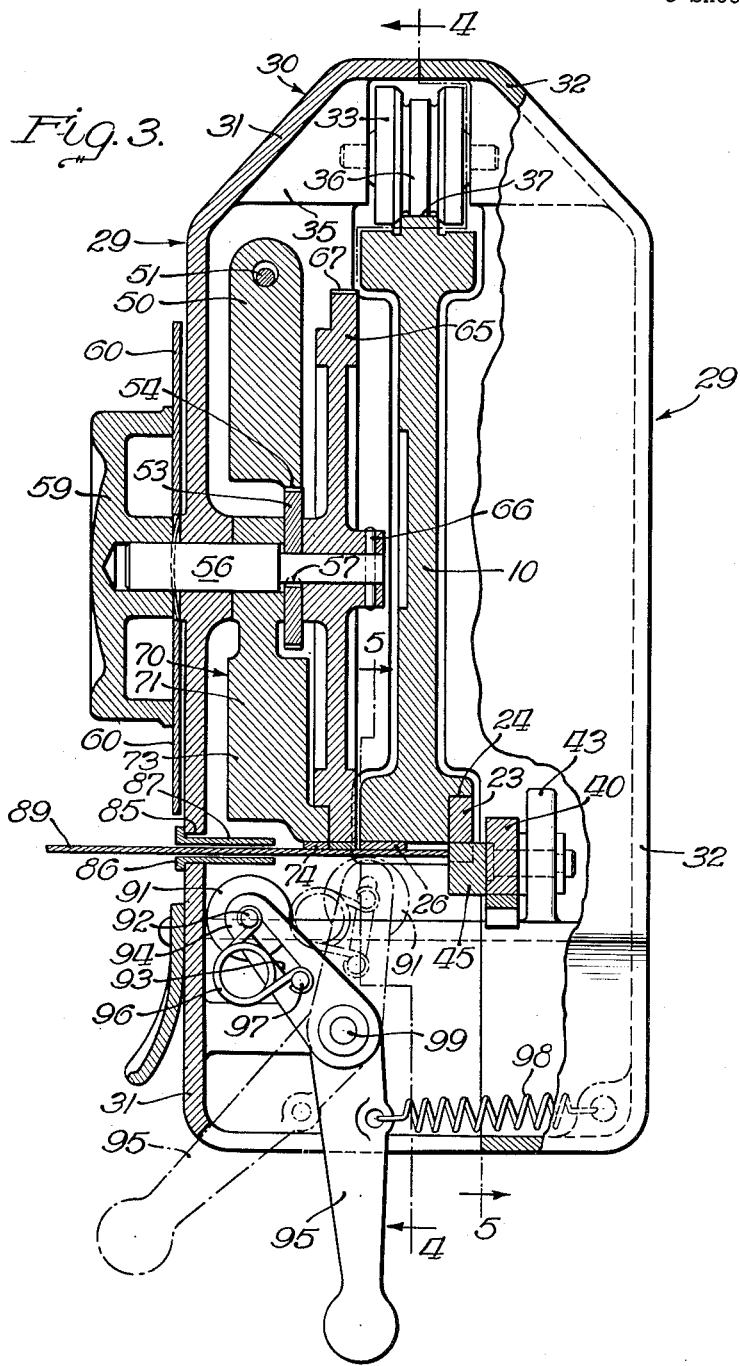
Figure 3 is a vertical sectional view, partly in elevation, taken on line 3—3 of Figure 2.
Figure 4:
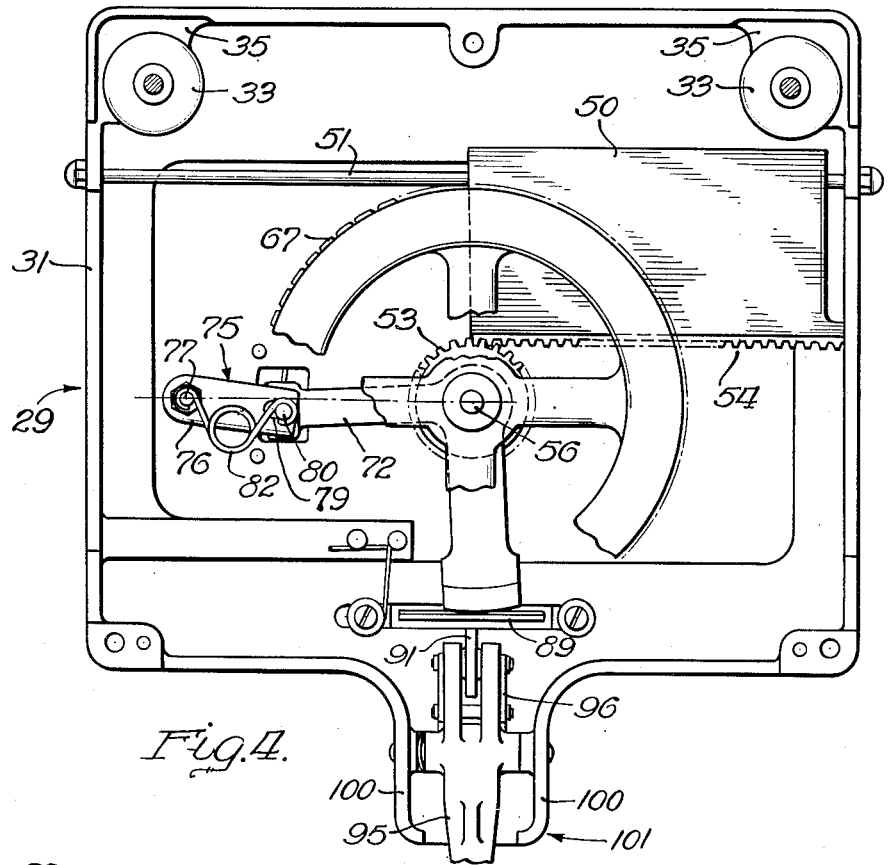
Figure 4 is a vertical, sectional view, partly broken away, taken on line 4—4 of Figure 3.
Figure 5:
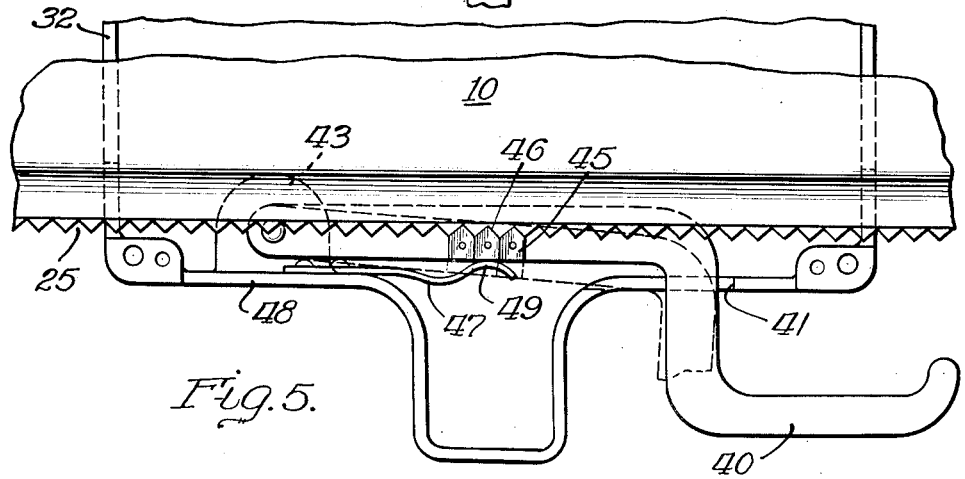
Figure 5 is a fragmentary vertical sectional view taken on line 5—5 of Figure 3.

A main poise 29 is mounted for selective adjustment on the beam 10. This poise has a casing 30 made up of two substantially cup-shaped members 31 and 32 secured together, as seen in Figure 3, to form a hollow casing. Two spaced rollers 33, Figures 3 and 4, are rotatably journalled in bosses 35 in the casing. Each roller has a reduced diameter central portion 36 that rides on a raised track 37 integrally formed on the top surface of the beam 10. The main poise 29 is manually moved along the beam 10 by means of a handle 40, Figures 2 and 5, that extends upwardly through an opening 41 in the casing member 32 for pivotal mounting on an upstanding ear 43 of the casing member 32. A plate 45, having a plurality of notches 46, is secured to the side face of the handle 40 in alignment with the notches 25 on the lower surface of the bar 23. A leaf spring 47, secured to the lower ledge 48 of the member 32 has a free outer end 49 bearing against the underside of the handle 40 to normally urge the notches 25 and 46 into engagement. It is evident therefore that, when the main poise 29 is to be adjusted along the beam 10, the handle 40 is pivoted clockwise about its pivot axis to disengage the notches 25 and 46. When a new position is selected, the handle is released, permitting the spring 47 to move the notches back into engagement.

A first auxiliary poise 50, of generally rectangular configuration, is slidably mounted inside the casing 30 on a rod 51 secured between opposite side walls of the casing member 31. The poise 50 is moved along the rod 51 by means of a pinion gear 53 which is in mesh with a rack 54 integrally formed on the lower edge of the poise 50. A shaft 56, Figure 3, is journalled in the front wall of the casing 30 and is keyed, as at 57, to the pinion gear 53. A control knob 59, keyed to the shaft 56 exteriorly of the casing, has an enlarged disk portion 60 which lies close against the front face of the casing 30. Near the radially outward marginal edge of the disk 60, numerals from 0 to 99 are inscribed as partially known in Figure 2. These numerals may be selectively brought into position opposite a window cut-out 62 in a plate 63 secured to the front face of the casing 30, as by rivets 64. It will be understood, of course, that each division on the disk 60 represents 10 pounds or 1/100 of the weight reading registered when the main poise is shifted from one notch to the next adjacent notch.

Near the rearmost end of the shaft 56 a wheel 65, Figure 3, is keyed by means of a pin 66. This wheel carries type numerals 67 on its peripheral surface, the wheel being of a diameter to position the numerals, selectively, alongside the type numerals 26 on the lower face of the beam 10. The spacing of the numerals 67 on the wheel 65 is, of course, correlated with the movements of the auxiliary poise 50 and with the numerals on the disk 60, so that the numeral printed on the ticket will correspond to the numeral that is in alignment with the window 62.

A special feature of the present invention resides in the second auxiliary poise which preferably is in the form of an angle member or bellcrank 70, Figure 2, having arms 71 and 72 extending at substantially a right angle to each other, with the arm 71 weighted as by the enlargement of its end portion 73. The angle poise is pivotally supported at its apex on shaft 56, and is selectively positionable and yieldably retained in either of two balance control positions by suitable mechanism hereinafter described, acting through the arm 72. In one position, illustrated in Figure 2, the weighted arm 71 depending from the pivot shaft 56 has the greater portion of its weighted end to the left of a vertical reference plane transverse of the beam 10 along the pivotal axis of the poise. In this position the indicia –0– inscribed on the outer end of the arm 72, appears in the window 62. Pivotal displacement of the angle poise counter-clockwise, from the position above indicated to its other position, serves to locate the depending arm 71 such that the greater portion of its weighted end 73 is to the right of the aforementioned reference plane. By preference in the embodiment illustrated, the extent of weight shift of arm 71, relative to the reference plane, is substantially the same in each position of the poise. Numeral 5 on the free end of the arm 72 then appears in the window 62. It is to be understood that the shift in the effective weight of the main poise 29 caused by the movement of the second auxiliary poise 70 from 0 to 5, and especially by the movement of the weighted end 73, will compensate for an addition of a 5 pound load on the scale platform or, in other words, it will compensate for one-half the weight registered by a movement of the disk 60 from one numeral to the next. Type numerals 74 on the end face of the lever 71 print either a zero or a 5 on the weight ticket.

The angle-type poise 70 is moved between its two indicating and recording positions by means of an over-center linkage 75, Figure 4. This linkage includes an elongated lever 76 one end of which is secured, as by a press fit, on a pin 77 that is journalled for rotation in the front wall of the casing 30. A knob 78, Figure 2, is keyed, in any suitable manner, to an end of the pin 77 that extends through the front wall. Thus, the pivoting movement of the lever 76 may be controlled through the knob 78.

A pin 80, Figure 4, extending rearwardly from the back surface of the poise arm 72, is engaged by the side walls of a slot 78 cut in the free end of the lever 76. Thus, when the lever 76 is pivoted about the axis of the pivot pin 77, the pin 80 is moved from one side to the other of an imaginary center-line through the pin 77 and the shaft 56. An expansion spring 82 has end portions anchored around the pins 77 and 80 and tends to hold the linkage in the selected over-center position.

In order that a weight ticket may be positioned under the type numerals 74, 67, and 26, a slot 85 is cut in the front wall of the casing 30. A ticket holder 86, having rearwardly extending flanges 87, is positioned in the slot 85. A ticket 89, is guided by the flanges 87 into position above a roller 91 mounted on a pin 92 which is slidably disposed in opposed slots 93 in a bifurcated end 94 of a lever 95. The pin 92 is normally urged to the outer limit of the slots 93 by an expansion spring 96 anchored around the pin 92 and around a pin 97 at the inner end of the slots 93. The lever 95 is pivotally mounted on a pin 99 which is secured in side walls 100, Figure 4, of a depending portion 101 of the casing 30. It will be seen that, when a ticket is inserted through the guide member 86 and into a position where the notched plate 45 acts as a limit, the lever 95 may be swung about its pivot pin 99 causing the roller 91 to press the ticket against the type numerals 74, 67, and 26. Upon release of the lever 95 a spring 98, which is connected between the lever 95 and the casing member 32, automatically returns the lever to initial position. A weight reading will be recorded either by imprinting the number in the ticket or by recording the impression on the ticket through a carbon paper inserted with the ticket.

The operation of the scale is as follows:

All three poises are moved to their zero reading. When the load comes on the scale, the main poise 29 is moved by the handle 40 to the notch or scale numeral nearest below the balancing position. The 1000 pounds reading will then be indicated by a pointer 102, Figure 2, secured to the casing 30 and the corresponding type numeral on the lower surface of the beam 10 will be moved into the printing position. Then the knob 59 is rotated to move the first auxiliary poise 50 from left to right on the rod 51 until the numeral on the disk 60 next below the balancing position is aligned with the window 63. At this time the balance indicating mark adjacent the end 11 of the beam 10 should be in substantial alignment with the balance line on the yoke 19. The knob 78 is then rotated to swing the angle-type poise to the "five" position. If the beam end 11 adjusts itself to a position closer to the true balance position, the poise 76 is left in the "five" position. If the beam end 11 moves past the true balance position to a position further removed from such true balance position than was obtained with the "zero" reading, the knob is, of course, rotated back to the "zero" position.

When the final balance position of the poises is obtained, the ticket 89 is inserted through the ticket holder 86, and the lever 95 is actuated to record the weight on the ticket.

From the foregoing description it will be seen that there is provided by this invention, a compact main poise structure having auxiliary poises efficiently mounted inside the main poise casing. The structure provides for substantially dust-free, moisture-free operation, and features a new angle-type second auxiliary poise arranged to supplement the action of a first auxiliary poise. The latter serves to bring the beam toward balance within substantially 10 units, while the second or two-position poise forming the principal subject of this invention, provides an adjustment of beam balance to within 5 units. Thus the present novel ankle-type poise facilitates beam balancing within desired close limits, more quickly and with greater accuracy than has been found possible with heretofore prevailing and known forms of poise structures.

It will be understood that modifications and variations may be effected without departing from the scope of the novel concepts of the present invention.

I claim as my invention:

1. In combination, a scale beam, a first poise adjustably mounted on said beam for movement from one to another of a plurality of equally spaced notches, an auxiliary poise located on said first poise and having a weighted portion movable from one to the other of but two fixed balance control positions, the first position of said auxiliary poise establishing a normal weight distribution of the first poise and the second position of the auxiliary poise being effective to shift the center of gravity of the first poise a distance sufficient to balance an additional weight increment equal to a predetermined fraction of the weight increment balanced by movement of the first poise between adjacent notches, a holding mechanism connected to said auxiliary poise to retain said auxiliary poise in said first or in said second balance control position, and control means for releasing said holding mechanism and moving said auxiliary poise selectively from said first to said second position and from said second to said first position.

2. In combination, a scale beam, a main poise adjustable mounted on said beam for movement between calibrated weight balancing positions, an auxiliary poise pivotally mounted on said main poise, said auxiliary poise having a weighted portion movable from one to the other of but two fixed balance control positions, the first position of said auxiliary poise establishing a normal weight distribution of the main poise and the second position of the auxiliary poise being effective to shift the center of gravity of the first poise a distance sufficient to balance an additional weight increment equal to a predetermined fraction of the weight increment balanced by movement of the first poise between adjacent balancing positions, and an actuating linkage connected to said auxiliary poise for moving said auxiliary poise between said two balance control positions, said linkage including an over-center, spring-loaded mechanism for positioning and releasably retaining the auxiliary poise in one or the other of said two limiting positions.

3. In combination, a scale beam, a main poise assembly including a closed housing slidably mounted on said beam for movement between weight-balancing positions, said housing having an opening in one wall thereof, an auxiliary poise mounted entirely in said closed housing and including a lever fulcrummed on said housing, said lever having a first weighted arm movable between two positions, and a second arm disposed substantially parallel to the inside face of said housing wall, a linkage operatively connected to said lever including a first pin journalled for rotation in the opening in said wall with one end extending exteriorly of the housing and the other projecting into the interior of the housing, a pivoting member secured at one end to said pin and having a slot at the other end, said slot having at least one end thereof closed, a second pin secured in the free end of said second arm and extending substantially normal thereto through said slot, and means to rotate said first pin from a point exteriorly of the housing to pivot the weighted arm of said lever between said two positions, said two positions being defined by the abutment of said second pin with a closed end of said slot in said member, said second pin abutting a closed end of said slot to dispose said weighted arm in one position or the other.

References Cited in the file of this patent

UNITED STATES PATENTS

| Number | Name | Date |
|---|---|---|
| 281,586 | Wailey | July 17, 1883 |
| 595,583 | Sargent | Dec. 14, 1897 |
| 1,668,774 | Lackey | May 8, 1928 |
| 1,769,768 | Causse | July 1, 1930 |
| 1,829,782 | Bousfield | Nov. 3, 1931 |
| 2,192,698 | Sowa | Mar. 5, 1940 |
| 2,582,485 | Hem | Jan. 15, 1952 |

FOREIGN PATENTS

| Number | Country | Date |
|---|---|---|
| 429,512 | France | Sept. 25, 1911 |
| 259,700 | Great Britain | Oct. 21, 1926 |